US012371209B2

(12) United States Patent
Kennison et al.

(10) Patent No.: US 12,371,209 B2
(45) Date of Patent: Jul. 29, 2025

(54) EDGE PROTECTION MOUNTING IN A SYSTEM FOR SHEET COIL PACKAGING

(71) Applicant: Lamiflex Group AB, Nyköping (SE)

(72) Inventors: John Charles Kennison, Grand Bay, AL (US); Aaron Kenneth Kitzmiller, Fort Loramie, OH (US); Steven Thomas Dircksen, Minster, OH (US)

(73) Assignee: Lamiflex Group AB, Nyköping. (SE)

( * ) Notice: Subject to any disclaimer, the term of this patent is extended or adjusted under 35 U.S.C. 154(b) by 75 days.

(21) Appl. No.: 18/512,833

(22) Filed: Nov. 17, 2023

(65) Prior Publication Data

US 2024/0375801 A1    Nov. 14, 2024

Related U.S. Application Data

(63) Continuation-in-part of application No. 18/373,470, filed on Sep. 27, 2023, and a continuation-in-part of application No. 18/144,370, filed on May 8, 2023.

(51) Int. Cl.
| | |
|---|---|
| *B65B 11/00* | (2006.01) |
| *B25J 9/16* | (2006.01) |
| *B65B 11/04* | (2006.01) |
| *B65B 13/18* | (2006.01) |
| *B65B 25/14* | (2006.01) |

(52) U.S. Cl.
CPC .......... *B65B 11/045* (2013.01); *B25J 9/1682* (2013.01); *B65B 13/181* (2013.01); *B65B 25/146* (2013.01)

(58) Field of Classification Search
CPC ... B65B 11/045; B65B 13/181; B65B 25/146; B25J 9/1682
See application file for complete search history.

(56) References Cited

U.S. PATENT DOCUMENTS

| | | | |
|---|---|---|---|
| 4,995,512 A | 2/1991 | Liebel | |
| 6,705,060 B1* | 3/2004 | McGuinness | ........... B65B 25/24 53/409 |
| 11,142,359 B2* | 10/2021 | Stone | .................... B65B 25/148 |

(Continued)

FOREIGN PATENT DOCUMENTS

| | | |
|---|---|---|
| EP | 4230536 A1 | 8/2023 |
| JP | 09-001273 A | 1/1997 |

(Continued)

*Primary Examiner* — Eyamindae C Jallow
(74) *Attorney, Agent, or Firm* — MEDLER FERRO WOODHOUSE & MILLS PLLC

(57) ABSTRACT

An edge protection mounting device for use in a system for sheet coil packaging is provided. The edge protection mounting device includes a mounting arm arrangement including at least one edge protection material guide, configured to feed out and guide edge protection material into correct positions along at least one edge of a sheet coil. The at least one edge protection material guide is shaped to guide the edge protection material so that it is displaced sideways from the mounting arm arrangement. Further, a system for sheet coil packaging is provided, including a sheet coil wrapping arrangement, a sheet coil rotating arrangement, and two edge protection mounting devices. A method of sheet coil packaging is also provided, including wrapping a sheet coil using a sheet coil wrapping arrangement, and feeding out edge protection material along edges of the sheet coil using two edge protection mounting devices.

25 Claims, 12 Drawing Sheets

(56) References Cited

U.S. PATENT DOCUMENTS

| | | | |
|---|---|---|---|
| 2018/0072441 A1* | 3/2018 | Tegström | B65B 25/24 |
| 2023/0227188 A1* | 7/2023 | Olsson | B65B 13/181 |
| | | | 53/399 |
| 2024/0051692 A1* | 2/2024 | Robèrt | B25J 9/0084 |
| 2024/0375810 A1 | 11/2024 | Kennison et al. | |

FOREIGN PATENT DOCUMENTS

| | | |
|---|---|---|
| JP | 3569947 B2 | 9/2004 |
| KR | 10-0534455 B1 | 12/2005 |
| KR | 10-2020-0074765 A | 6/2020 |
| KR | 10-2206541 B1 | 1/2021 |
| WO | 2021/219861 A2 | 11/2021 |

* cited by examiner

EDGE PROTECTION MOUNTING IN A SYSTEM FOR SHEET COIL PACKAGING

CROSS-REFERENCE TO RELATED APPLICATIONS

This application is a continuation-in-part application of prior U.S. patent application Ser. No. 18/144,370, filed May 8, 2023 and is a continuation-in-part application of prior U.S. patent application Ser. No. 18/373,470, filed Sep. 27, 2023, each of which are herein incorporated by reference in their entirety.

TECHNICAL FIELD

The present disclosure relates generally edge protection mounting in systems for sheet coil packaging.

BACKGROUND

Coils of sheet metal need to be properly wrapped in order to protect the sheet metal during transport and storage. Especially the edges of the sheet metal coils need to be properly protected, so that the sheet metal will not be damaged along the edges. US20230227188 describes the mounting of edge protection material on the edges of a sheet coil, in a system for sheet coil wrapping using two robot arms and a wrapping tool. During a wrapping sequence, the first robot arm inserts the wrapping tool into the central hole of the sheet coil and hands it over to the second robot arm, which transports the wrapping tool along the outside of the sheet coil and hands it back to the first robot arm.

Problems with the Prior Art

Prior art edge protection mounting devices are quite bulky, and the application of edge protection material on both the inner and the outer edges of the sheet coil is time consuming. There is thus a need for an improved edge protection mounting device for use in a system for sheet coil packaging.

SUMMARY

The present disclosure relates to an edge protection mounting device for use in a system for sheet coil packaging. The edge protection mounting device preferably comprises a mounting arm arrangement comprising at least one edge protection material guide, configured to feed out and guide edge protection material into correct positions along at least one edge of a sheet coil. The at least one edge protection material guide is preferably shaped to guide the edge protection material so that it is displaced sideways from the mounting arm arrangement. This allows the mounting arm arrangement of the edge protection mounting device to be positioned at the side of a sheet coil, instead of above or below it, and thereby allows the system for sheet coil packaging to be much more compact.

The present disclosure further relates to a system for sheet coil packaging. The system preferably comprises: a sheet coil wrapping arrangement, arranged for wrapping a sheet coil; a sheet coil rotating arrangement, arranged to rotate the sheet coil while it is wrapped by the sheet coil wrapping arrangement; and two edge protection mounting devices, each comprising a mounting arm arrangement comprising at least one edge protection material guide, arranged to feed out and guide edge protection material into correct positions along at least one edge of a sheet coil, as the sheet coil is rotated by the sheet coil rotating arrangement, while it is wrapped by the sheet coil wrapping arrangement, thereby fixing the edge protection material to the edges of the sheet coil by the wrapping. The at least one edge protection material guide is preferably shaped to guide the edge protection material so that it is displaced sideways from the mounting arm arrangement. This allows the mounting arm arrangements of the edge protection mounting devices to be positioned beside opposite ends of the sheet coil, instead of above or below the sheet coil, and thereby makes the whole system for sheet coil packaging much more compact.

In embodiments, each mounting arm arrangement comprises an outer edge protection material guide, configured to feed out and guide edge protection material into a correct position along an outer edge of a sheet coil, and an inner edge protection material guide, configured to feed out and guide edge protection material into a correct position along an inner edge of a sheet coil. Such edge protection mounting devices allow for a much quicker application of both inner and outer edge protection than what is known from the prior art.

In embodiments, each mounting arm arrangement comprises a hinge arrangement, arranged to allow the part of the mounting arm that comprises the at least one edge protection material guide to be moved out of the way when the at least one edge protection material guide is not used.

In embodiments, each edge protection mounting device comprises an arm support which carries the mounting arm arrangement, wherein the arm support comprises a horizontal adjusting arrangement and a vertical adjusting arrangement. This allows the mounting arm arrangement to be positioned to allow the edge protection material guides to guide the edge protection material into correct positions on the edges of a sheet coil. This enables a simple adjustment to sheet coils of varying dimensions.

In embodiments, the mounting arm arrangement carries an edge protection material coil, comprising edge protection material that is thin enough to be wound up in a folded state. This means that it is not necessary to provide an arrangement for folding the edge protection material between the edge protection material coil and the edge protection material guides.

The present disclosure also relates to an edge protection mounting material adapted to be used in an edge protection mounting device in a system for sheet coil packaging. The edge protection material preferably comprises slits along both longitudinal sides, so that a series of tongues are formed on both longitudinal sides. The length of the tongues is preferably adapted to the width of an edge protection material guide, thereby making the edge protection material easily guidable through said edge protection material guide to be displaced sideways in a folded state into correct positions along the edges of a sheet coil. The slits make it possible to use the edge protection material guides to guide folded edge protection material into the correct position along the edges of the sheet coil from the side of an end of the sheet coil.

In embodiments, the shape of the tongues depends on the size of the sheet coil onto which the edge protection material is intended to be mounted, in such a way that the tongues are shaped so that the slits become substantially closed at the base of the sheet coil when the edge protection material is mounted on the outer edge of the sheet coil. This allows the edge protection material to cover the surface around the edge of the sheet coil to the largest possible extent.

In embodiments, the sheet coil wrapping arrangement comprises first and second industrial robots, having first and second robot arms, arranged to wrap the sheet coil using a wrapping tool, using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement.

In embodiments, the system further comprises a further sheet coil rotating arrangement and two further edge protection mounting devices, in order to enable the sheet coil wrapping arrangement to wrap sheet coils in two different positions.

The present disclosure further relates to a method for sheet coil packaging. The method preferably comprises: wrapping a sheet coil using a sheet coil wrapping arrangement; and feeding out edge protection material along edges of the sheet coil as the sheet coil is rotated by a sheet coil rotating arrangement during said wrapping of the sheet coil, using two edge protection mounting devices. Each edge protection mounting device preferably comprises a mounting arm arrangement, on which at least one edge protection material guide is arranged to feed out and guide edge protection material into correct positions along at least one edge of a sheet coil, as the sheet coil is rotated by the sheet coil rotating arrangement while it is wrapped by the sheet coil wrapping arrangement, thereby fixing the edge protection material to the edges of the sheet coil by the wrapping. The feeding out of edge protection material through the at least one edge protection material guide preferably comprises displacing the edge protection material sideways from the mounting arm arrangement. This allows the mounting arm arrangement to be positioned beside opposite ends of the sheet coil, instead of above or below the sheet coil, and thereby allows the system for sheet coil packaging to be much more compact.

In embodiments, the method further comprises arranging, on each mounting arm arrangement, an outer edge protection material guide to feed out and guide edge protection material into a correct position along an outer edge of a sheet coil, and an inner edge protection material guide to feed out and guide edge protection material into a correct position along an inner edge of a sheet coil. Such a method allows for a much quicker application of both inner and outer edge protection than what is known from the prior art.

In embodiments, the method comprises moving the part of the mounting arm comprising the at least one edge protection material guide out of the way when the at least one edge protection material guide is not needed, using a hinge arrangement comprised in the mounting arm arrangement.

In embodiments, the method comprises positioning the edge protection material guides so that they will guide the edge protection material into the correct positions along the edges of the sheet coil, using an arm support, comprising a horizontal adjusting arrangement and a vertical adjusting arrangement, comprised in the edge protection mounting device. This allows the mounting arm arrangement to be positioned to allow the edge protection material guides to guide the edge protection material into correct positions on the edges of a sheet coil. This enables a simple adjustment to sheet coils of varying dimensions.

In embodiments, the method comprises using an edge protection material that is thin enough to be wound up in a folded state on an edge protection material coil carried by the mounting arm arrangement. This means that it is not necessary to provide an arrangement for folding the edge protection material between the edge protection material coil and the edge protection material guides.

In embodiments, the method comprises using an edge protection material that comprises slits along both longitudinal sides, so that a series of tongues are formed on both longitudinal sides. The slits make it possible to use the edge protection material guides to guide folded edge protection material into the correct position along the edges of the sheet coil from the side of an end of the sheet coil.

In embodiments, the method comprises arranging the shape of the tongues to depend on the size of the sheet coil, in such a way that the tongues are shaped so that the slits become substantially closed at the base of the sheet coil when the edge protection material is mounted on the outer edge of the sheet coil. This allows the edge protection material to cover the surface around the edge of the sheet coil to the largest possible extent.

The length of the tongues is preferably adapted to the width of the at least one edge protection material guide, so that the edge protection material is easily guided through the at least one edge protection material guide.

In embodiments, the method comprises guiding the edge protection material in a folded state into correct positions along the edges of the sheet coil.

In embodiments, the method comprises arranging the sheet coil wrapping arrangement to comprise first and second industrial robots, having first and second robot arms, arranged to wrap the sheet coil using a wrapping tool, and the wrapping of the sheet coil to comprise using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement. However, the method works also with other types of sheet coil wrapping arrangements—it may not be necessary to use industrial robots.

In embodiments, the edge protection material comprises plastic and/or cardboard.

In embodiments, the sheet coil is a sheet metal coil.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The present disclosure relates to systems and methods for sheet coil packaging. Embodiments of the disclosed solution are presented in more detail in connection with the figures.

Figure 1:
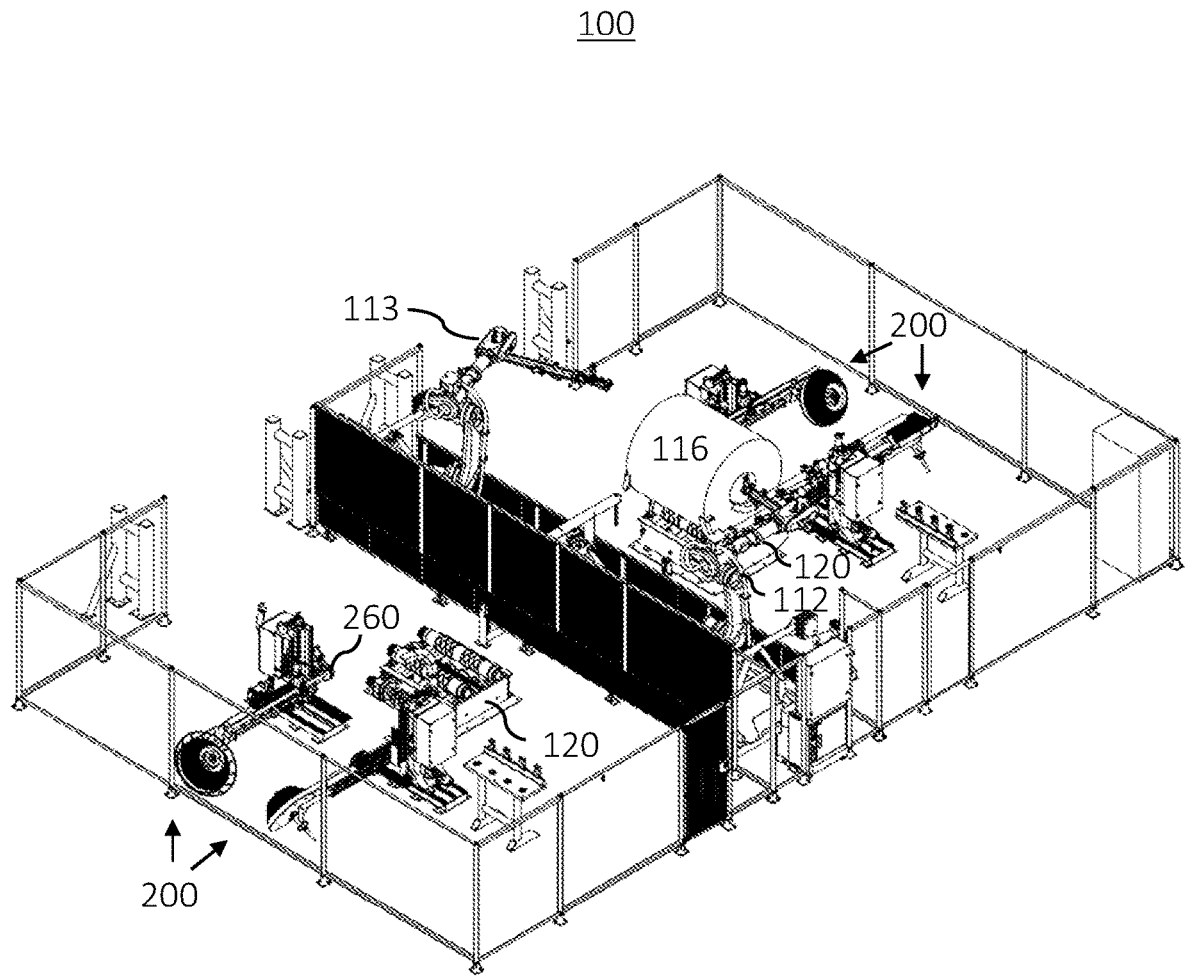
FIG. 1 shows a system for sheet coil packaging, in accordance with one or more embodiments described herein.

FIG. 1 shows a system 100 for sheet coil packaging. The system 100 illustrated in FIG. 1 comprises a sheet coil wrapping arrangement comprising two industrial robots 112, 113, and two pairs of edge protection mounting devices 200, each pair arranged together with a sheet coil rotating arrangement 120 arranged to rotate a sheet coil 116 to enable it to be wrapped. The sheet coil wrapping arrangement 112, 113 is arranged to wrap a sheet coil 116 as the sheet coil 116 is rotated by the sheet coil rotating arrangement 120. The sheet coil 116 is thus preferably wrapped in synchronization with the feeding out of edge protection material 400 from edge protection mounting devices 200, so that the edge protection material 400 becomes fixed to the sheet coil 116 by the wrapping as the sheet coil 116 is rotated by the sheet coil rotating arrangement 120.

In the system 100 illustrated in FIG. 1, the same sheet coil wrapping arrangement 112, 113 may wrap sheet coils 116 on sheet coil stations on either side of the sheet coil wrapping arrangement 112, 113 in synchronization with the feeding out of edge protection material 400 from the currently active pair of edge protection mounting devices 200, so that the edge protection material 400 becomes fixed to the sheet coil 116 by the wrapping as the sheet coil 116 is rotated by the sheet coil rotating arrangement 120. However, the system 100 may comprise only one sheet coil station, and thus only one pair of edge protection mounting devices 200 and one sheet coil rotating arrangement 120.

Figure 2A:
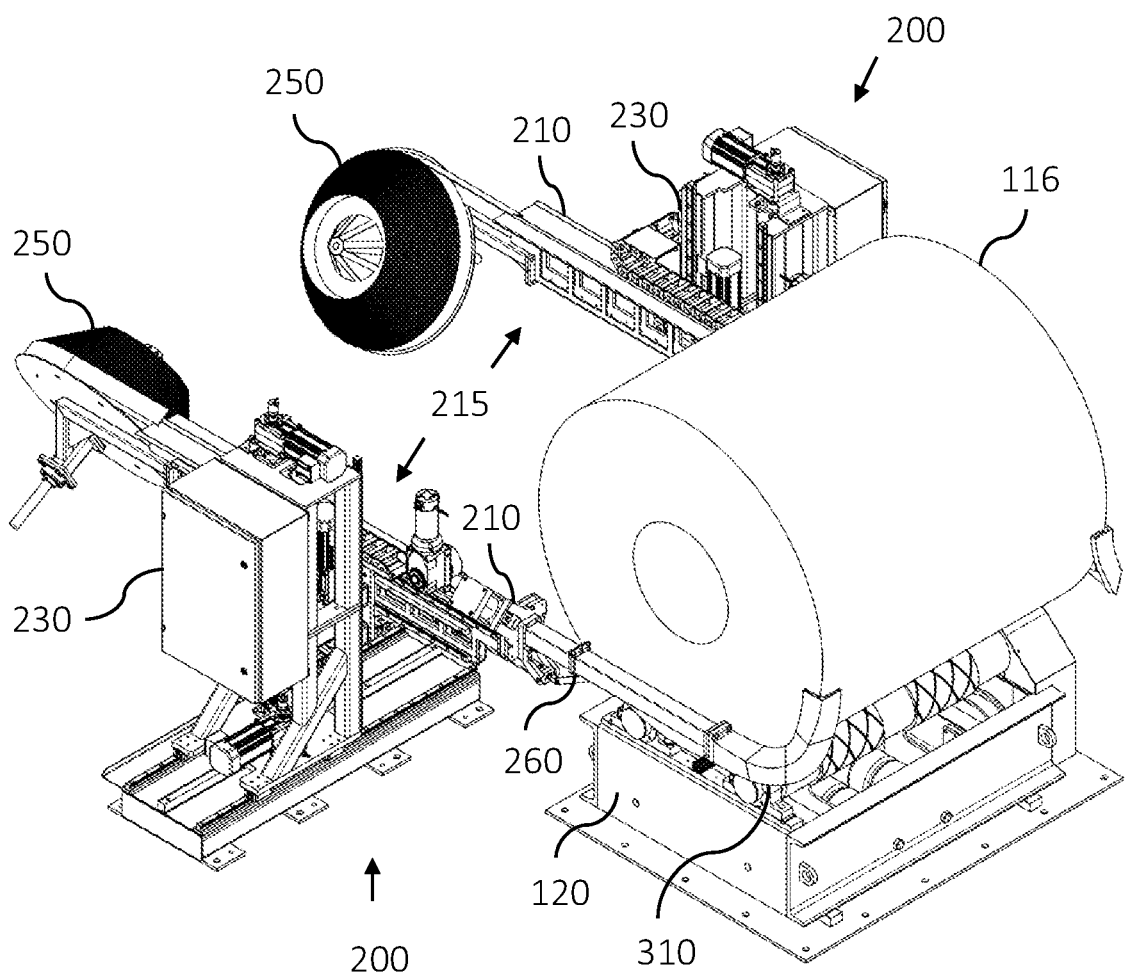
FIG. 2a-e show edge protection mounting devices suitable for use in a system for sheet coil packaging, in accordance with one or more embodiments described herein.
Figure 2B:
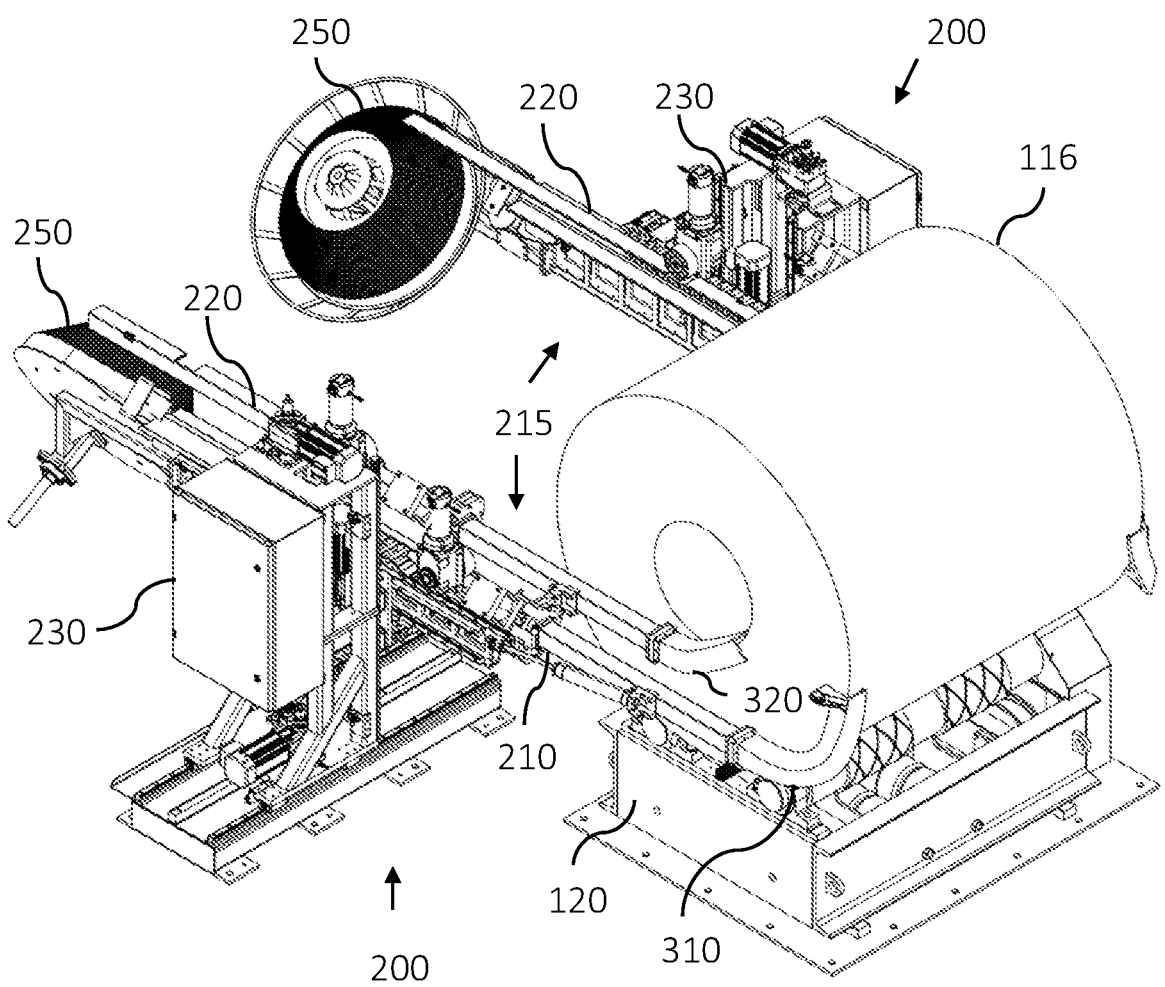
Figure 2C:
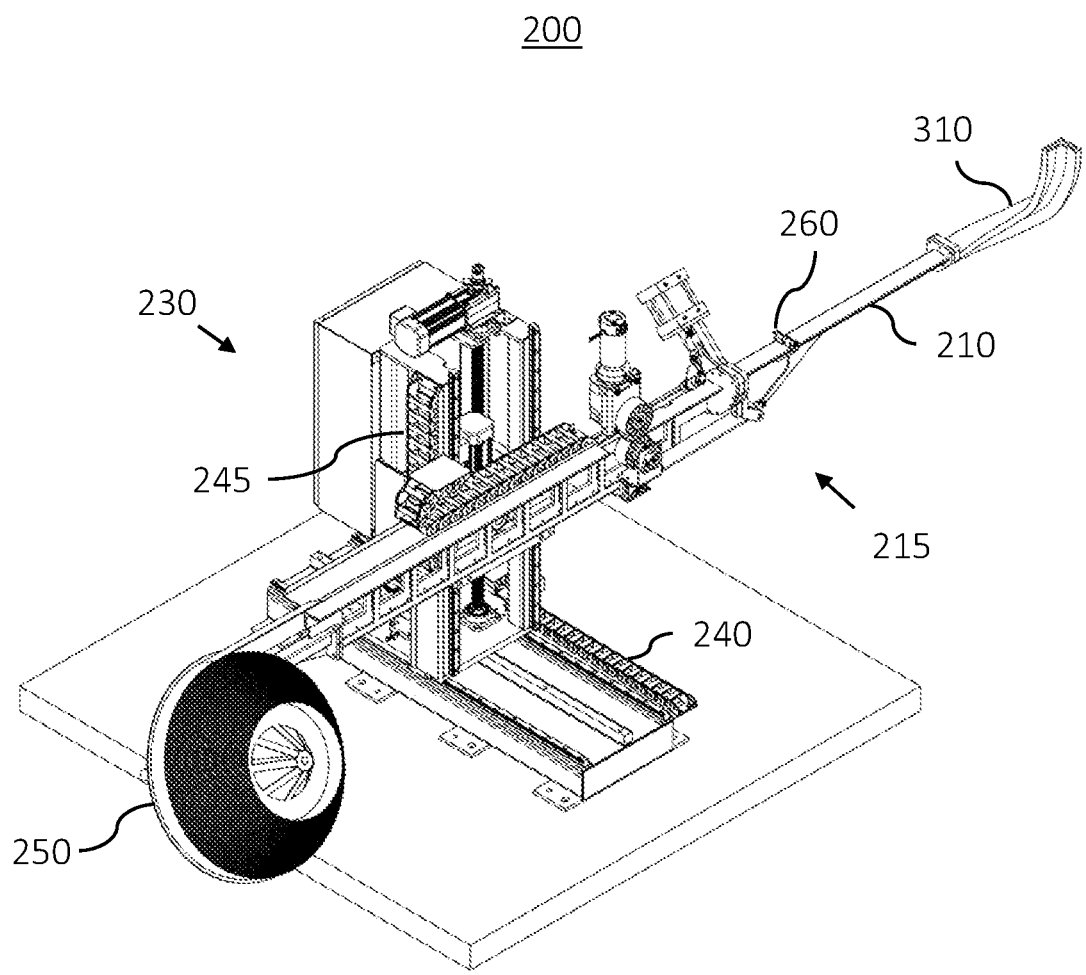
Figure 2D:
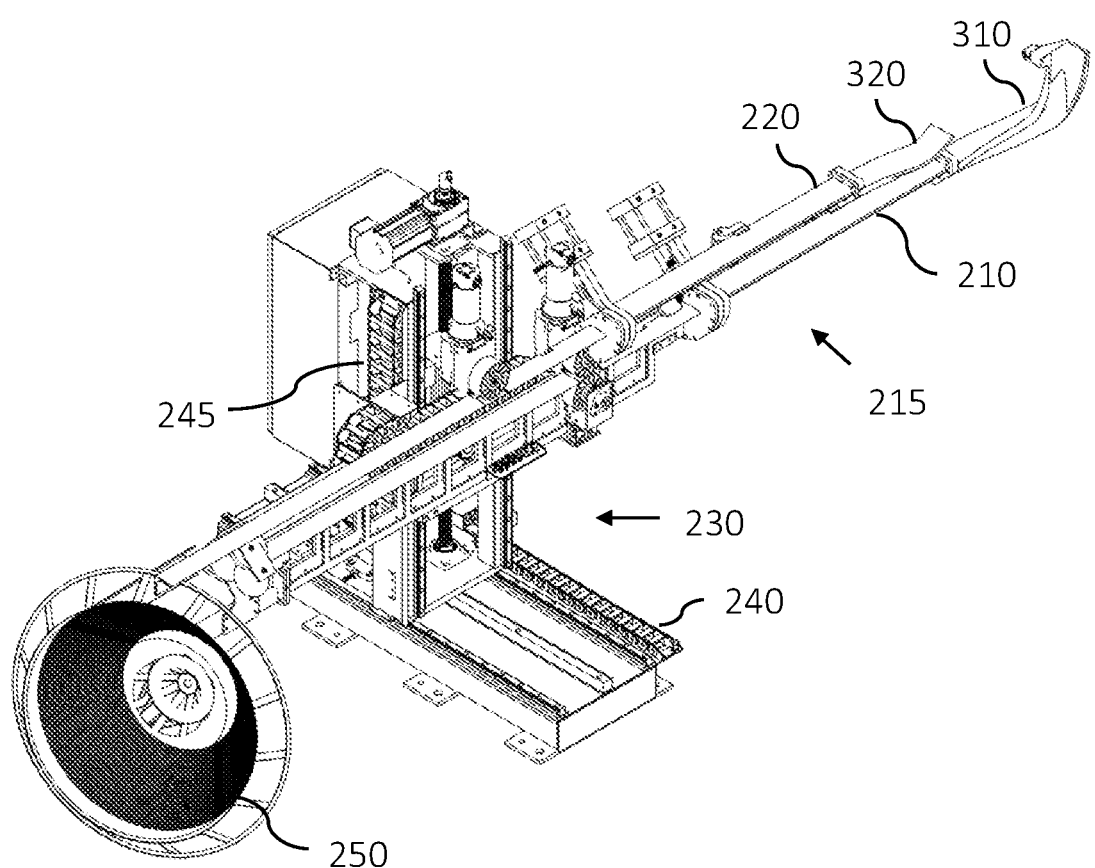
Figure 2E:
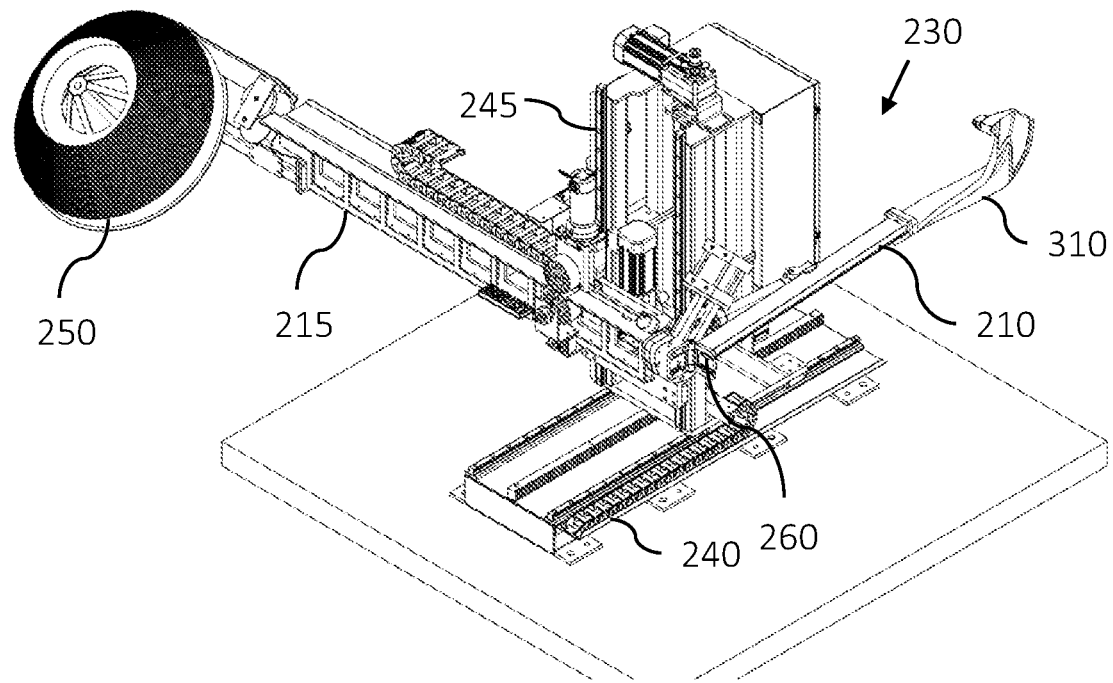

Since it is desirable to have edge protection material 400 on both sides of the sheet coil 116, there are preferably two edge protection mounting devices 200, one arranged beside either end of the sheet coil 116. The fact that the edge protection mounting devices 200 are arranged at the side of the sheet coil 116, instead of above or below it, makes the whole system for sheet coil packaging much more compact. Two edge protection mounting devices 200 may thus be arranged beside opposite ends of a sheet coil 116, to feed out and guide edge protection material 400 into correct positions along the edges of the sheet coil 116 as the sheet coil 116 is rotated by the sheet coil rotating arrangement 120. FIGS. 2a-b show different embodiments of two edge protection mounting devices 200, arranged together with a sheet coil rotating arrangement 120 arranged to rotate a sheet coil 116 to enable it to be wrapped, in a system 100 for sheet coil packaging. FIGS. 2c-e are closer views of the edge protection mounting devices 200.

The illustrated edge protection mounting device 200 comprises a mounting arm arrangement 215, which is carried by an arm support 230. On a first end of the illustrated mounting arm arrangement 215, an edge protection material coil 250 is arranged. The edge protection material coil 250 has a conical shape, because the edge protection material 400 has been wound up on the edge protection material coil 250 in a folded state. The folded edge protection material 400 is preferably wound up on the edge protection material coil 250 with a small displacement for each turn on the edge protection material coil 250. It is however possible to use an edge protection material coil 250 that is not carried by the mounting arm arrangement 215. It is also not necessary for the edge protection material 400 to be wound up in a folded state on the edge protection material coil 250—there may instead be an arrangement for folding the edge protection material provided between the edge protection material coil 250 and the edge protection material guides 310, 320.

As shown in FIGS. 2b and 2d, the edge protection mounting device 200 may be arranged to mount inner edge protection at the same time as mounting outer edge protection, using the same type of edge protection material 400. The mounting arm arrangement 215 illustrated in FIGS. 2b and 2d therefore comprises two mounting arms, an outer mounting arm 210 and an inner mounting arm 220. The outer edge protection is mounted using the outer mounting arm 210, and the inner edge protection is mounted using the inner mounting arm 220. At the end of the outer mounting arm 210, an outer edge protection material guide 310 is arranged. Correspondingly, at the end of the inner mounting arm 220, an inner edge protection material guide 320 is arranged.

The same edge protection material coil 250 may be arranged to allow the feeding out of edge protection material 400 to both the outer edge protection material guide 310 and the inner edge protection material guide 320, e.g. by comprising two separate windings of edge protection material 400 on the same edge protection material coil 250. There may also be two different edge protection material coils 250. In this case, it is possible to arrange both edge protection material coils 250, just one of them, or none of them, on the mounting arm arrangement 215. One or more edge protection material coils 250 may be arranged separately from the mounting arm arrangement 215, so as to feed the mounting arm arrangement 215 with edge protection material 400.

If the edge protection mounting device 200 illustrated in FIGS. 2a, 2c and 2e is used, edge protection material may instead be mounted on the inner edges of the sheet coil 116 before the wrapping begins. US20230227188 describes a method of creating a ring of edge protection material and mounting it on the inner edges of the sheet coil 116. It is also possible to simply pick a pre-created ring of edge protection material and mount it on the inner edges of the sheet coil 116 before the wrapping begins.

Figure 3A:
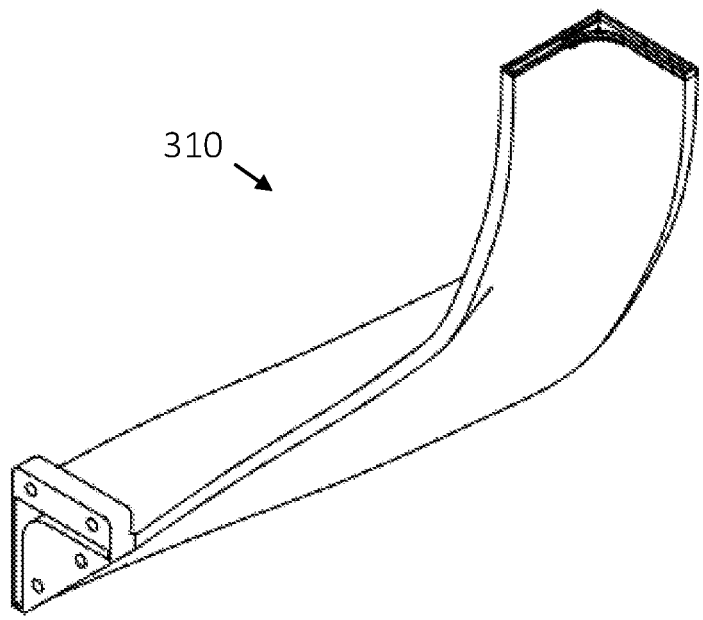
FIGS. 3a-b show edge protection material guides, in accordance with one or more embodiments described herein.
Figure 4A:
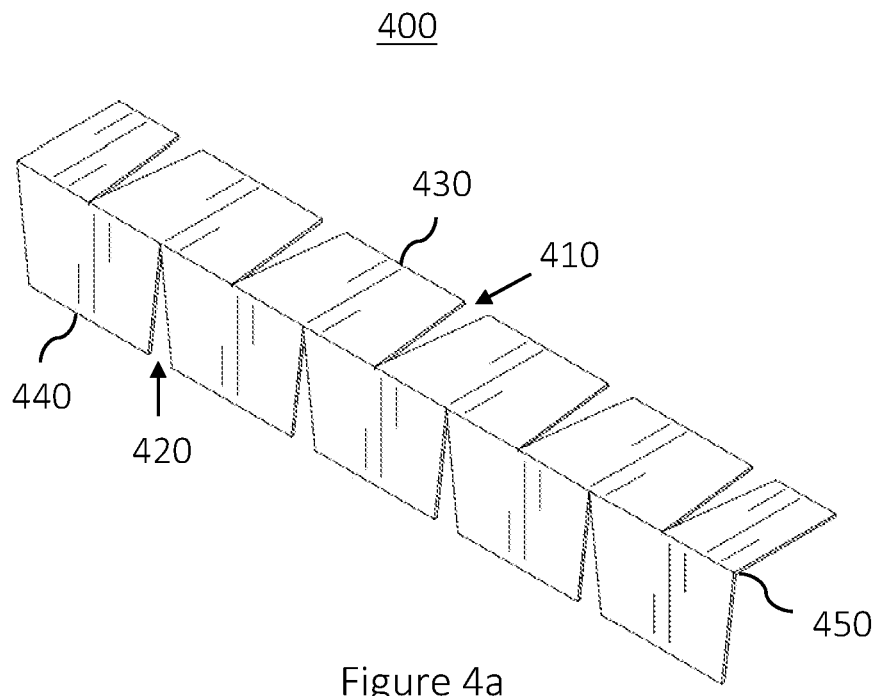
FIGS. 4a-c show edge protection material, in accordance with one or more embodiments described herein.
Figure 4B:
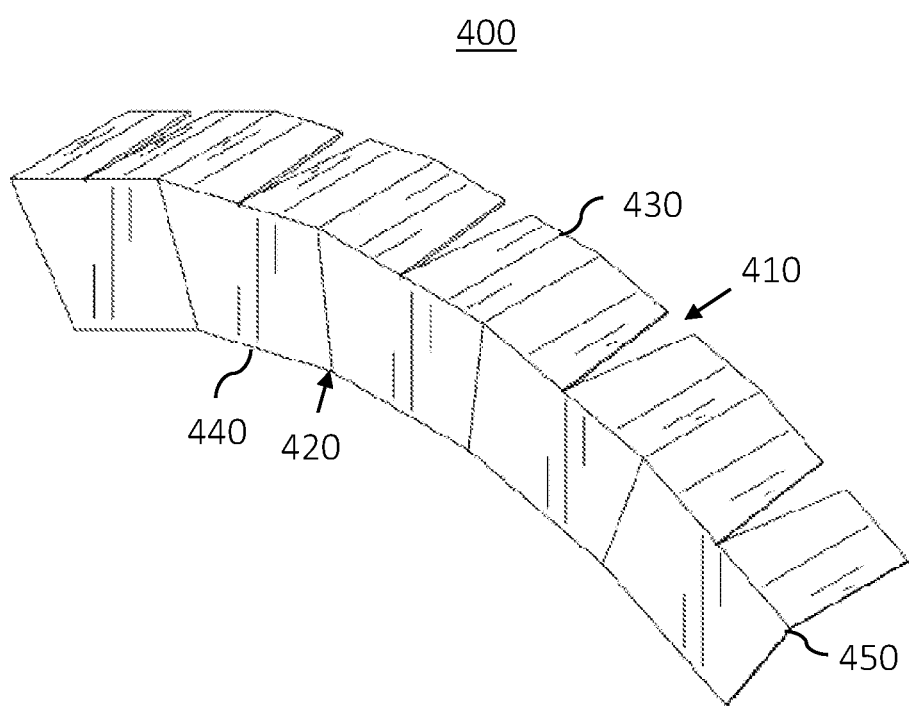
Figure 4C:
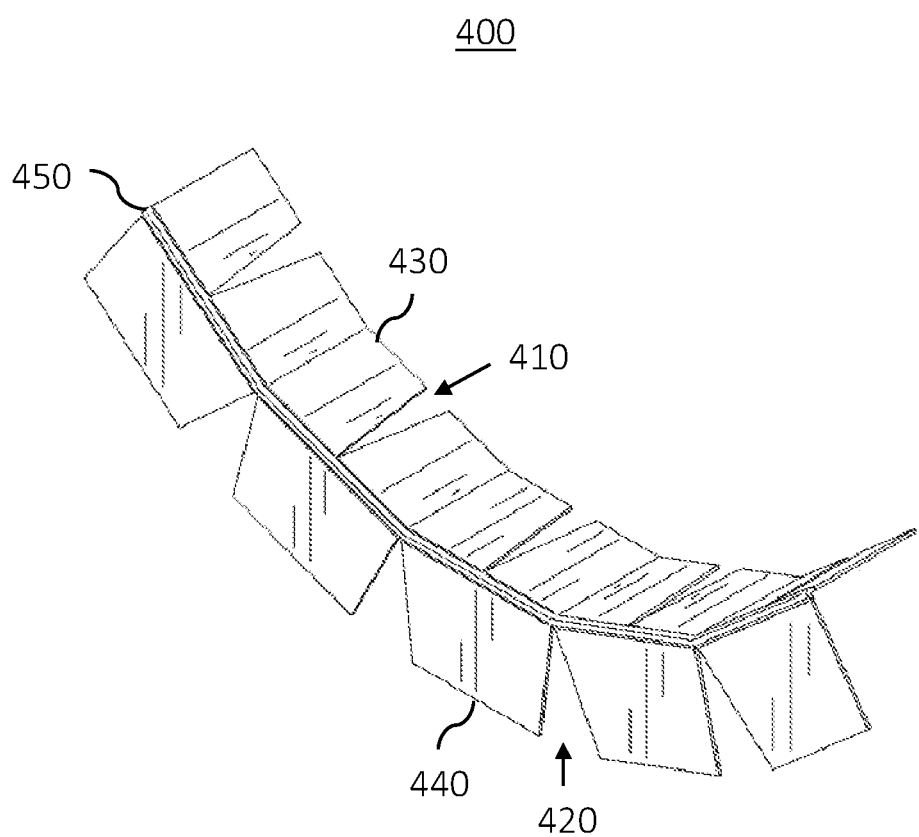

FIG. 3a is a closer view of the outer edge protection material guide 310. The outer edge protection material guide 310 is attached to the outer mounting arm 210 of the mounting arm arrangement 215, preferably at the end of the outer mounting arm 210, and shaped to allow the guiding of folded edge protection material 400 into the correct position on the outer edge of the sheet coil 116. The shape of the outer edge protection material guide 310 however makes it difficult for folded edge protection material 400 that is too rigid to be guided through it. It is thus necessary to use edge protection material 400 where slits 410, 420 are arranged on both sides of the fold 450, so that a series of tongues 430, 440 are formed, when using the outer edge protection material guide 310 illustrated in FIG. 3a. Such edge protection material 400 is illustrated in FIGS. 4a-c. The slits 410, 420 enable the edge protection material 400 to be flexible enough to be guidable through the illustrated outer edge protection material guide 310, and thereby be displaced sideways from the mounting arm arrangement 215, even though the actual material (preferably plastic and/or cardboard) is quite rigid. As explained above, the edge protection material 400 does not have to be wound up in a folded state on the edge protection material coil 250, it is possible to instead provide an arrangement for folding the edge protection material between the edge protection material coil 250 and the outer edge protection material guide 310.

Figure 3B:
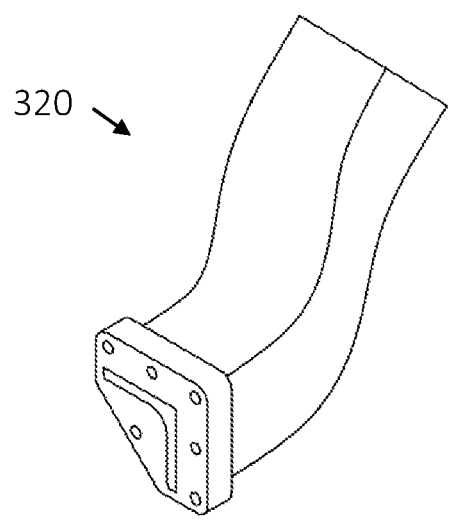

FIG. 3b is a closer view of the inner edge protection material guide 320. The inner edge protection material guide 320 is attached to the inner mounting arm 220 of the mounting arm arrangement 215, preferably at the end of the inner mounting arm 220, and shaped to allow the guiding of folded edge protection material 400 into the correct position on the inner edge of the sheet coil 116, in the central hole 118 of the sheet coil 116, from a point which is not located above or below the sheet coil 116.

The mounting arm arrangement 215 is preferably moved so that the outer edge protection material guide 310 is positioned to apply the folded edge protection material 400 along the outer edge of the sheet coil 116, while at the same time the inner edge protection material guide 320 is positioned to apply the folded edge protection material 400 along the inner edge of the sheet coil 116, as the sheet coil 116 is rotated by the sheet coil rotating arrangement 120. The arm support 230 is preferably arranged to be easily adjustable both horizontally and vertically, so that it will be easy to position the mounting arm arrangement 215 so that the outer edge protection material guide 310 and the inner edge protection material guide 320 will guide the folded edge protection material 400 into the correct positions on the edges of the sheet coil 116. The arm support 230 therefore preferably comprises both a horizontal adjusting arrangement 240 and a vertical adjusting arrangement 245. This enables a simple adjustment to sheet coils 116 of varying dimensions.

The edge protection mounting device 200 for use in the system 100 for sheet coil packaging may thus comprise a mounting arm arrangement 215 comprising at least one edge protection material guide 310, 320, configured to feed out and guide edge protection material 400 into correct positions along at least one edge of a sheet coil 116, wherein the at least one edge protection material guide 310, 320 is shaped to guide the edge protection material 400 so that it is displaced sideways from the mounting arm arrangement 215. The edge protection mounting device 200 may further comprise an arm support 230 which carries the mounting arm arrangement 215. The mounting arm arrangement 215 has a first end, where an edge protection material coil 250 comprising wound-up edge protection material 400 in a folded state may be arranged, and a second end, which comprises at least one mounting arm 210, 220, where an edge protection material guide 310, 320 is arranged. It is however not necessary for the edge protection material coil 250 to be carried by the mounting arm arrangement 215, or for the edge protection material 400 to be wound-up in a folded state on the edge protection material coil 250.

The system 100 for sheet coil packaging preferably comprises: a sheet coil wrapping arrangement 112, 113, arranged for wrapping a sheet coil 116; a sheet coil rotating arrangement 120, arranged to rotate the sheet coil 116 while it is wrapped by the sheet coil wrapping arrangement 112, 113; and two edge protection mounting devices 200, each comprising a mounting arm arrangement 215 comprising at least one edge protection material guide 310, 320, arranged to feed out and guide edge protection material 400 into correct positions along at least one edge of a sheet coil 116, as the sheet coil 116 is rotated by the sheet coil rotating arrangement 120, while it is wrapped by the sheet coil wrapping arrangement 112, 113, thereby fixing the edge protection material 400 to the edges of the sheet coil 116 by the wrapping, wherein the at least one edge protection material guide 310, 320 is shaped to guide the edge protection material 400 so that it is displaced sideways from the mounting arm arrangement 215. As illustrated in FIGS. 1 and 2a-b, the edge protection mounting devices 200 are preferably arranged beside opposite ends of the sheet coil 116, as it is rotated by the sheet coil rotating arrangement 120. The fact that the edge protection mounting devices 200 are arranged at the side of the sheet coil 116, instead of above or below it, makes the whole system 100 for sheet coil packaging much more compact.

FIGS. 4a-c show edge protection material to be used together with the above described edge protection mounting devices 200. As explained above, the edge protection material 400 preferably comprises slits 410, 420 along both longitudinal sides, so that a series of tongues 430, 440 are formed on both longitudinal sides. The shape of the tongues 430, 440 preferably depends on the size of the sheet coil 116 onto which the edge protection material 400 is intended to be mounted. As explained above, it is necessary to have slits 410, 420 in the edge protection material 400, since it is these slits 410, 420 that enable the edge protection material 400 to be flexible enough to be guidable through the illustrated outer edge protection material guide 310, and thereby displaced sideways from the mounting arm arrangement 215, even though the actual material (preferably plastic and/or cardboard) is quite rigid. The slits 410, 420 should preferably not simply be straight cuts in the material, since that would cause the tongues 430, 440 to overlap each other as the material is bent as it is mounted around the outer edge of the sheet coil 116. However, for optimal protection of the sheet coil 116, it is still preferred if the edge protection material 400 covers the surface around the edge to the largest possible extent. It is therefore preferred to shape the tongues 440 so that the slits 420 become substantially closed at the base of the sheet coil 116 when the edge protection material 400 is mounted on the outer edge of the sheet coil 116. This is illustrated in FIG. 4b.

If the edge protection material 400 is symmetric, so that the slits 410, 420 and the tongues 430, 440 have the same shapes along both longitudinal sides of the edge protection material 400, this makes it easier to use the same edge protection material 400 for all edge protection mounting devices 200. It is however possible to use an asymmetric edge protection material 400, where only the slits 420 and the tongues 440 that are to be arranged at the base of the sheet coil 116 are shaped to become substantially closed when the edge protection material 400 is mounted on the outer edge of the sheet coil 116. The slits 410 and the tongues 430 that are arranged at the outside of the sheet coil 116 may simply be straight cuts in the material, since this would mean that the edge protection material 400 covers the surface around the edge to the largest possible extent.

The length of the tongues 430, 440 is preferably adapted to the width of the at least one edge protection material guide 310, 320, so that the edge protection material 400 is easily guided through the at least one edge protection material guide 310, 320.

The edge protection material 400 is preferably guided in a folded state into correct positions along the edges of the sheet coil. As explained above, the edge protection material 400 may be wound up in a folded state on the edge protection material coil 250, but it is possible to instead provide an arrangement for folding the edge protection material between the edge protection material coil 250 and the outer edge protection material guide 310.

Figure 5:
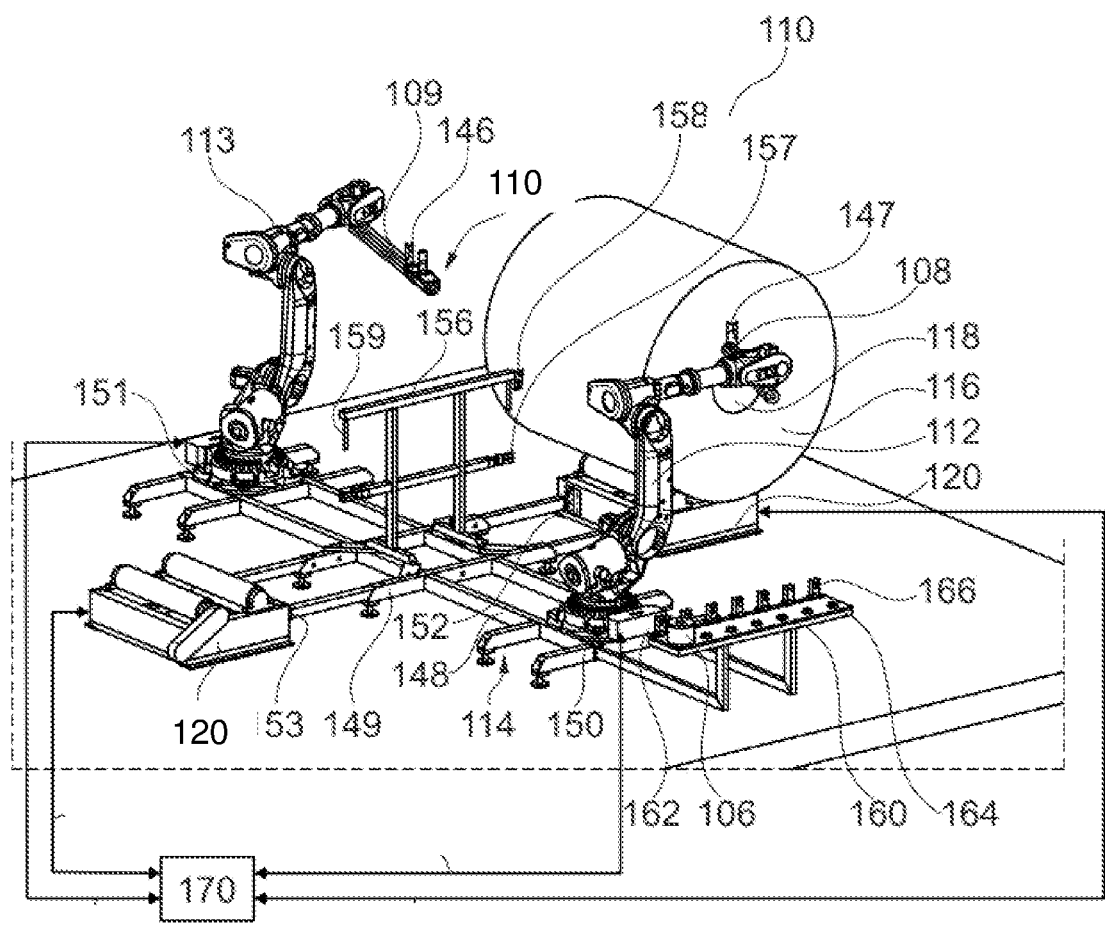
FIG. 5 shows a sheet coil wrapping arrangement comprising two industrial robots in a system for sheet coil packaging, in accordance with one or more embodiments described herein.

The sheet coil wrapping arrangement may e.g. comprise two industrial robots 112, 113, as shown in FIG. 5, arranged to wrap a sheet coil 116 as the sheet coil 116 is rotated by the sheet coil rotating arrangement 120. Each of the industrial robots 112, 113 preferably has a robot arm 108, 109 arranged to wrap the sheet coil 116 using a wrapping tool 110. The first robot arm 108 inserts the wrapping tool 110 into a central hole 118 of the sheet coil 116 and hands over the wrapping tool 110 to the second robot arm 109. The second robot arm 109 then transports the wrapping tool 110 along the outside of the sheet coil 116 and hands it back to the first robot arm 108. This sequence then continues as the sheet coil 116 is rotated by the sheet coil rotating arrangement 120. In the system 100, the two industrial robots 112, 113 are arranged to wrap the sheet coil 116 in synchronization with the feeding out of edge protection material 400, so that the edge protection material 400 becomes fixed to the sheet coil 116 by the wrapping as the sheet coil 116 is rotated by the sheet coil rotating arrangement 120. There is preferably an integrated cutting arrangement in each edge protection mounting device 200, so that the edge protection material 400 can be cut to the desired length before the wrapping is finished. The length is preferably calculated based on the determined diameter of the sheet coil 116.

As shown in FIG. 5, the robot arms 108, 109 may each comprise a wrapping material clamp 146, 147 configured to hold a strip of wrapping material, preferably mounted close to the distal end of the robot arm 108, 109. When a sheet coil 116 has been fully wrapped, a strip of the wrapping material may be clamped in the clamping station 156 and the strip cut. For the purpose of cutting the wrapping material, a strip of the wrapping material may be turned around a shaft 159 at the clamping station 156, in order to keep track of where the wrapping material is in the robot space, and thereafter the strip may be cut. Before cutting the strip of wrapping material, the strip may also be held by the clamp 146, 147 of one of the robot arms 108, 109, so that the remaining wrapping material on a roll 106 on the wrapping tool 110 is ready for a new wrapping procedure. A loose-end strip of the wrapping material turned around the coil may e.g. be arranged to tack to the wrapping by self-adhesive properties. The wrapping material may e.g. be stretch film in a plastic material.

The system 100 works also with other types of sheet coil wrapping arrangements—it may not be necessary to use industrial robots 112, 113.

After the wrapping operation in the wrapping station, a crane or similar may be used to lift out the wrapped sheet coil to an after-processing station, where supplementing packing operations may be carried out manually or semi-automatically.

The system 100 may comprise a robot jig 114 having a first 148 and possibly a second 149 intersecting leg. The first leg 148 of the robot jig 114 is configured with first 150 and a second 151 robot base mounts placed apart on said first leg 148. The second leg 149 of the robot jig 114 may be configured with a first coil roller abutment 152 placed at an end of the second leg 149. The sheet coil rotating arrangement 120 may e.g. be positioned in relation to the robot jig 114 with the aid of positioning beams with abutment, so that the sheet coil rotating arrangement 120 will not be in physical or mechanical contact with the robot jig 114 during operation, in order to avoid dynamical forces being conveyed to the robot jig 114.

In embodiments configured with two sheet coil stations, the robot jig 114 may comprise two sheet coil rotating arrangements 120, and thus a second coil roller abutment 153 placed at the other end of the second leg 149.

The robot jig 114 shown in FIG. 5 is configured with two robot base mounts 150, 151 placed apart on a first leg of the cross geometry, as well as a first and a second coil roller abutment 152, 153 placed apart on a second leg of the cross geometry. First 112 and second 113 industrial robots are mounted on the respective robot base mounts 150, 151. First and second sheet coil rotating arrangements 120 are placed in the respective coil roller abutments 152, 153. Such sheet coil rotating arrangements 120 are per se known and typically comprise a cradle of two rollers that are actuatable to give a sheet coil 116 placed in the cradle a rotating movement.

In the embodiment shown in FIG. 5, the robot jig 114 is configured with a general cross geometry of substantially perpendicular legs with one or more bars, i.e. the bars making up the legs and thus the one or more bars intersecting at substantially right angles. Other intersecting angles may be configured with adapted configurations of the robots, their range and their movements. In the embodiment shown in FIG. 5, each leg comprises two parallel bars. Other embodiments include only a first leg, as described above.

Sheet coils 116 appear in different sizes. A large coil may have a length of 2300 mm, normal sizes are in the range of 1200 to 1500 mm length and down to a minimum that may be 800 mm length. The central hole 118 often has an inner diameter of 508 or 610 mm, and there are diameters as small as 420 mm. The outer diameter of a coil may vary from for example 1 to 2.5 meters.

The system 100 may further comprise a wrapping material clamping station 156 placed within reach of at least one robot arm 108, 109, for example placed substantially midway between the industrial robots 112, 113. The wrapping material clamping station 156 may be provided with one or more wrapping material clamps 157, 158 configured to hold a strip of wrapping material. The wrapping material clamping station 156 may e.g. be placed substantially at the intersection of the first and second legs 148, 149 of the robot jig 114, for example substantially midway between the robot base mounts 150, 151. The wrapping material clamping station 156 may be provided with one or more wrapping material clamps 157, 158 configured to hold a strip of wrapping material.

The system 100 may further comprise a roll magazine 160 for storing a plurality of rolls 106 of wrapping material available to one or more of the industrial robots 112, 113. The roll magazine 160 may e.g. be configured with one or more roll places 164, and an associated wrapping material clamp 162, 166 for each roll of wrapping material. The wrapping material clamps 162, 166 may each be configured to hold a strip of wrapping material. The roll magazine 160 may in use be positioned and placed within reach of at least one of the robots, for example at the side of the robot setup or in front of one of the robots e.g. at the side of the coil roller.

The system 100 may further comprise a measuring arrangement configured to measure the position and dimensions of a sheet coil 116 positioned on a sheet coil rotating arrangement 120 for being packaged with wrapping material. In embodiments, the measuring system comprises one or more laser measuring tools, for example mounted on one of or both robot arms 108, 109. With such a laser measuring tool mounted on the robot arm, it is preferable that it is positioned such that is has an optical line that is unobstructed by a roll of wrapping material attached to the wrapping tool 110. When measuring the position and dimensions, the system 100 is configured to find the center of the coil, follow the contours and calculate the position and the dimensions.

The system 100 may further comprise a robot control system 170 configured to control the movement of the industrial robots 112, 113 in relation to a sheet coil 116 positioned on a sheet coil rotating arrangement 120 in the system 100. The robot control system 170 may comprise input/output interfaces configured to be communicably couplable to the industrial robots 112, 113, to one or more sheet coil rotating arrangements 120, and/or to a human/machine interface (not shown) for example in the form of a GUI generating a dashboard. The robot control system 170 may be used for determining the dimensions of a sheet coil 116 before applying edge protection.

Figure 6A:
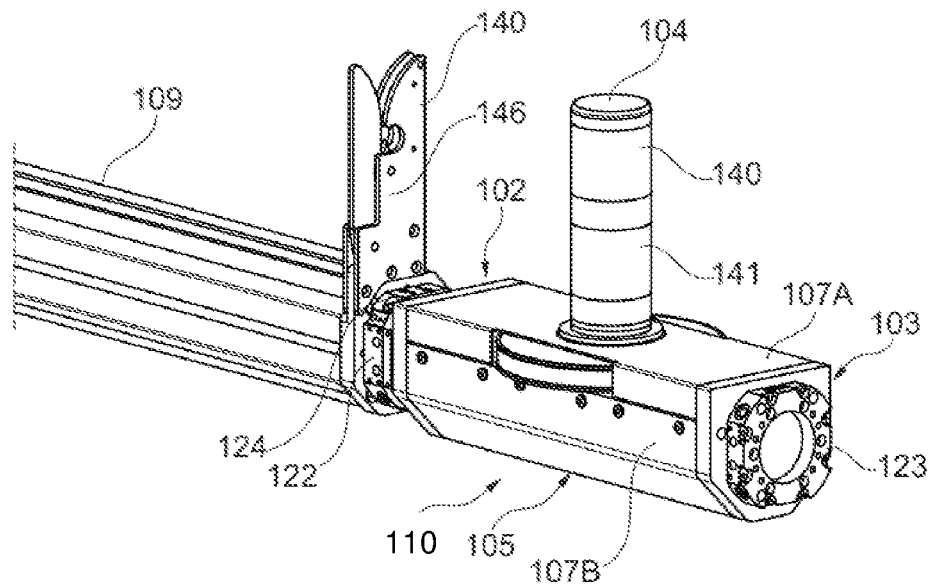
FIGS. 6a-b show a wrapping tool, in accordance with one or more embodiments described herein.
Figure 6B:
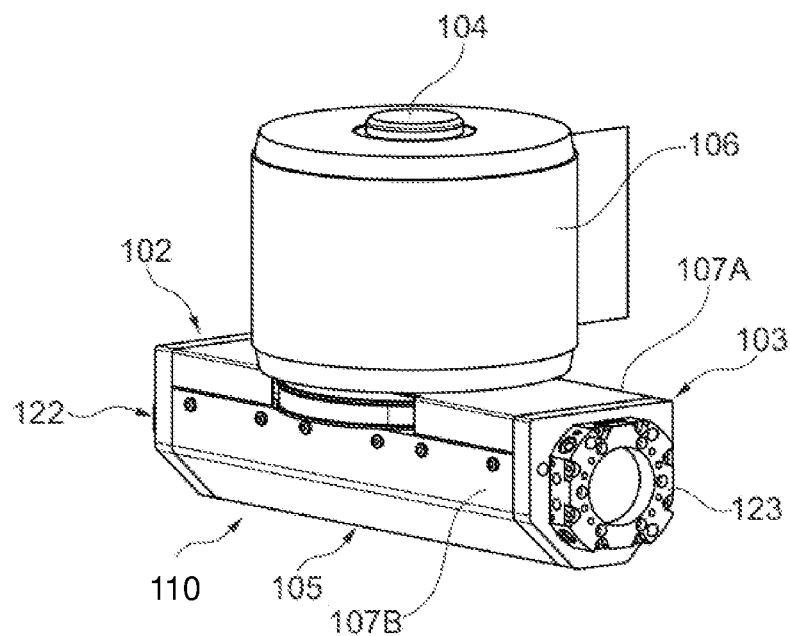

FIG. 6a shows a wrapping tool 110 provided with a roll holder shaft 104 for holding a roll 106 of wrapping material and being configured for handover between robot arms 108, 109, and FIG. 6b shows the wrapping tool 110 of FIG. 6a with a roll 106 of wrapping material placed on the roll holder shaft 104.

The wrapping tool 110 preferably comprises two opposing ends 102, 103, each end being provided with a coupling tool piece 122, 123 configured to interface with a robot arm 108, 109. The wrapping tool 110 preferably further comprises a roll holder shaft 104 configured to hold a roll 106 of packaging material, the holder shaft 104 at one end being rotatably mounted substantially midway between said, preferably opposing, ends 102, 103 and projecting substantially perpendicular to an axis extending between said, preferably opposing, ends 102, 103. The wrapping tool 110 may be provided with a housing 105 comprising one or more cover plates 107A, 107B.

In embodiments, the robot arms 108, 109 are each provided with a coupling robot piece 124, 125, for example a gripper or a master piece of a tool changer, configured to be able to grip or mate with a respective coupling tool piece 122, 123 of the wrapping tool 110. As shown in FIG. 6a, a robot arm 109 may be coupled to the wrapping tool 110 via a coupling robot piece 124 that is mated with the robot tool piece 122 to the left in FIG. 6a at one end 102. At the other end 103 of the wrapping tool 110, to the right in FIG. 6a, a second coupling tool piece 123 is available for coupling to another robot arm 108 not shown in FIG. 6a.

The coupling tool pieces 122, 123 of the wrapping tool 110 are configured to be able to convey actuating power from a power supply line of a robot, such as an industrial robot. The actuating power may in different embodiments for example be in the form of pneumatic power, hydraulic power or electric power. The coupling may typically be configured to be couplable by a bayonet coupling and/or locked in position by means of actuation power controlled by the respective robots.

The coupling configured for interfacing between the industrial robots and the wrapping tool 110 may be configured in the form of a robot tool changer, with the coupling tool piece 122, 123 configured to be able to mate with a coupling master piece 124, 125 of said tool changer mounted on a respective robot arm 108, 109. Such couplings may be configured with a presence sensor adapted to detect or indicate that the wrapping tool 110 is attached to the robot arm 108, 109. The presence sensor may e.g. be integrated in the tool changer functionality of the coupling and be based on pneumatic or electric signals that are readable by the robot control system, or arranged at the side of the coupling, for example in the form of an electric presence detector coupled to the robot control system.

The roll holder shaft 104 may comprise a roll fixture 140, 141 configured to releasably fix a roll of wrapping material to the roll holder shaft 104. For example, a portion 140, 141 of the roll holder shaft 104 may be configured to be radially expandable to enable a roll fixture to releasably fix a roll of wrapping material to the roll holder shaft 104. This may e.g. be implemented as one or more inflatable bladders 140, 141 that are controllably inflatable by means of pneumatic power, i.e. pressurized air, conveyed from the respective robots via the coupling interfaces. Alternatively, the roll fixture 140, 141 may be actuatable for example by electric or hydraulic power. An embodiment comprises first and a second radially expandable portions 140, 141 in the form of inflatable bladders on the shaft 104, such that the first expandable portion is configured to fix a roll of wrapping material having a first lesser wideness, and such that the combined first and second expandable portions are configured to fix a roll of wrapping material having a larger wideness.

The wrapping tool 110 may further comprise at least one motor configured to be able to drive, prevent and/or brake rotation of the roll holder shaft 104. This may enable driving of the roll holder shaft 104 in first rotational direction, e.g. forwards, for example to roll out wrapping material from the roll in synchronization with the movement of the robots, or in a second rotational direction, e.g. backwards, for example to roll up or in wrapping material onto the roll in order gather superfluous wrapping material or increase the tension of the wrapping material. This further enables prevention of rotation of the roll, for example in order to keep a rolled out strip of wrapping material at a certain length or to keep a current tension of the wrapping material. Further, this enables braking of the rotation of the roll, for example in order to obtain, vary or keep a certain tension in the roll.

Figure 7:
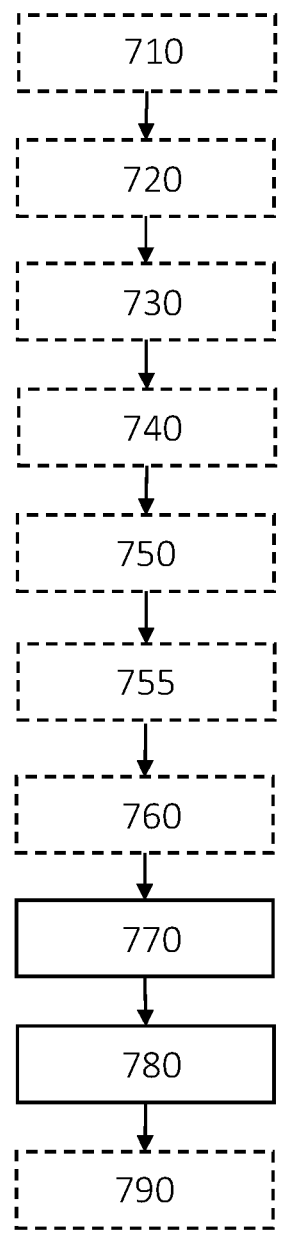
FIG. 7 schematically illustrates a method for sheet coil packaging, in accordance with one or more embodiments described herein.

FIG. 7 schematically illustrates a method 700 for sheet coil packaging. The method 700 may comprise:

Step 770: wrapping a sheet coil 116 using a sheet coil wrapping arrangement 112, 113.

Step 780: feeding out edge protection material 400 along the edges of the sheet coil 116 as the sheet coil 116 is rotated by the sheet coil rotating arrangement 120 during said wrapping 730 of the sheet coil 116, using two of the above described edge protection mounting devices 200, each comprising a mounting arm arrangement 215, on which at least one edge protection material guide 310, 320 is arranged to feed out and guide edge protection material 400 into correct positions along at least one edge of a sheet coil 116, as the sheet coil 116 is rotated by the sheet coil rotating arrangement 120 while it is wrapped by the sheet coil wrapping arrangement 112, 113, thereby fixing the edge protection material 400 to the outer edges of the sheet coil 116 by the wrapping, wherein the feeding out 780 of edge protection material 400 through the edge protection material guides 310, 320 comprises displacing the edge protection material 400 sideways from the mounting arm arrangement 215.

This allows the mounting arm arrangements 215 to be positioned beside opposite ends of the sheet coil 116. The fact that the mounting arm arrangements 215 are arranged at the side of the sheet coil 116, instead of above or below it, makes the whole system 100 for sheet coil packaging much more compact.

In embodiments, the sheet coil 116 is a sheet metal coil.

The method 700 may further comprise one or more of:

Step 710: arranging the sheet coil wrapping arrangement 112, 113 to comprise first 112 and second 113 industrial robots, having first 108 and second 109 robot arms, arranged to wrap the sheet coil 116 using a wrapping tool 110, and the wrapping 730 of the sheet coil 116 to comprise using sequences of the first robot arm 108 inserting the wrapping tool 110 into a central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120. However, the method 700 works also with other types of sheet coil wrapping arrangements—it may not be necessary to use industrial robots 112, 113.

Step 720: arranging, on each mounting arm arrangement 215, an outer edge protection material guide 310 to feed out and guide edge protection material 400 into a correct position along an outer edge of a sheet coil 116, and an inner edge protection material guide 320 to feed out and guide edge protection material 400 into a correct position along an inner edge of a sheet coil 116. Such a method allows for a much quicker application of both inner and outer edge protection than what is known from the prior art.

Step 730: positioning the edge protection material guides 310, 320 so that they will guide the edge protection material 400 into the correct positions along the edges of the sheet coil 116, using an arm support 230, comprising a horizontal adjusting arrangement 240 and a vertical adjusting arrangement 245, comprised in the edge protection mounting device 200. This enables a simple adjustment to sheet coils 116 of varying dimensions.

Step 740: using an edge protection material 400 that is thin enough to be wound up in a folded state on an edge protection material coil 250 carried by the mounting arm arrangement 215. This means that it is not necessary to provide an arrangement for folding the edge protection material between the edge protection material coil and the edge protection material guides.

Step 750: using an edge protection material 400 that comprises slits 410, 420 along both longitudinal sides, so that a series of tongues 430, 440 are formed on both longitudinal sides. The slits make it possible to use the edge protection material guides to guide folded edge protection material into the correct position along the edges of the sheet coil from the side of an end of the sheet coil.

Step 755: arranging the shape of the tongues 430, 440 of the edge protection material 400 to depend on the size of the sheet coil 116, in such a way that the tongues 430, 440 are shaped so that the slits 420 become substantially closed at the base of the sheet coil 116 when the edge protection material 400 is mounted on the outer edge of the sheet coil 116. This allows the edge protection material 400 to cover the surface around the edge of the sheet coil 116 to the largest possible extent.

Step 760: guiding the edge protection material 400 in a folded state into correct positions along the edges of the sheet coil 116.

Step 790: moving the part of the mounting arm arrangement 215 comprising the at least one edge protection material guide 310, 320 out of the way when the at least one edge protection material guide 310, 320 is not needed, using a hinge arrangement 260 comprised in the mounting arm arrangement 215.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Further, not all of the steps of the claims have to be carried out in the listed order. All technically meaningful orders of the steps are covered by the claims. Accordingly, the scope of the invention is defined only by the claims.

The invention claimed is:

1. An edge protection mounting device for use in a system for sheet coil packaging, wherein the edge protection mounting device comprises a mounting arm arrangement comprising at least one edge protection material guide, configured to feed out and guide edge protection material into correct positions along at least one edge of a sheet coil, wherein the at least one edge protection material guide is shaped to guide the edge protection material so that it is displaced sideways from the mounting arm arrangement.

2. The edge protection mounting device according to claim 1, wherein the mounting arm arrangement comprises an outer edge protection material guide, configured to feed out and guide edge protection material into a correct position along an outer edge of a sheet coil, and an inner edge protection material guide, configured to feed out and guide edge protection material into a correct position along an inner edge of a sheet coil.

3. The edge protection mounting device according to claim 1, wherein the mounting arm arrangement comprises a hinge arrangement, arranged to allow the part of the mounting arm arrangement that comprises the at least one edge protection material guide to be moved out of the way when the at least one edge protection material guide is not used.

4. The edge protection mounting device according to claim 1, wherein the edge protection mounting device comprises an arm support which carries the mounting arm arrangement, wherein the arm support comprises a horizontal adjusting arrangement and a vertical adjusting arrangement.

5. The edge protection mounting device according to claim 1, wherein the mounting arm arrangement carries an edge protection material coil, comprising edge protection material that is thin enough to be wound up in a folded state.

6. An edge protection mounting material adapted to be used in an edge protection mounting device in a system for sheet coil packaging, wherein the edge protection material comprises slits along both longitudinal sides, so that a series of tongues are formed on both longitudinal sides, wherein the length of the tongues is adapted to the width of an edge protection material guide, thereby making the edge protection material easily guidable through said edge protection material guide to be displaced sideways in a folded state into correct positions along the edges of a sheet coil.

7. The edge protection mounting material according to claim 6, wherein the shape of the tongues depends on the size of a sheet coil onto which the edge protection material is intended to be mounted, in such a way that the tongues are shaped so that the slits become substantially closed at the base of the sheet coil when the edge protection material is mounted on an outer edge of the sheet coil.

8. A system for sheet coil packaging, the system comprising:
 a sheet coil wrapping arrangement, arranged for wrapping a sheet coil;
 a sheet coil rotating arrangement, arranged to rotate the sheet coil while it is wrapped by the sheet coil wrapping arrangement; and
 two edge protection mounting devices, each comprising a mounting arm arrangement comprising at least one edge protection material guide, arranged to feed out and guide edge protection material into correct positions along at least one edge of a sheet coil, as the sheet coil is rotated by the sheet coil rotating arrangement, while it is wrapped by the sheet coil wrapping arrangement thereby fixing the edge protection material to the edges of the sheet coil by the wrapping, wherein the at least one edge protection material guide is shaped to guide the edge protection material so that it is displaced sideways from the mounting arm arrangement.

9. The system according to claim 8, wherein each mounting arm arrangement comprises an outer edge protection material guide, arranged to feed out and guide edge protection material into a correct position along an outer edge of the sheet coil, and an inner edge protection material guide, arranged to feed out and guide edge protection material into a correct position along an inner edge of the sheet coil.

10. The system according to claim 8, wherein each mounting arm arrangement comprises a hinge arrangement 260, arranged to allow the part of the mounting arm arrangement that comprises the at least one edge protection material guide to be moved out of the way when the at least one edge protection material guide is not used.

11. The system according to claim 8, wherein the edge protection mounting devices each comprise an arm support which carries the mounting arm arrangement, wherein the arm support comprises a horizontal adjusting arrangement and a vertical adjusting arrangement.

12. The system according to claim 8, wherein the mounting arm arrangement carries an edge protection material coil, comprising edge protection material that is thin enough to be wound up in a folded state.

13. The system according to claim 8, wherein the edge protection material comprises slits along both longitudinal sides, so that a series of tongues are formed on both longitudinal sides, and is guided in a folded state into correct positions along the edges of the sheet coil.

14. The system according to claim 13, wherein the shape of the tongues depends on the size of the sheet coil, in such a way that the tongues are shaped so that the slits become substantially closed at the base of the sheet coil when the edge protection material is mounted on an outer edge of the sheet coil.

15. The system according claim 8, wherein the sheet coil wrapping arrangement comprises first and second industrial robots, having first and second robot arms, arranged to wrap the sheet coil using a wrapping tool, using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement.

16. The system according to claim 8, further comprising a further sheet coil rotating arrangement and two further edge protection mounting devices, in order to enable the sheet coil wrapping arrangement to wrap sheet coils in two different positions.

17. A method for sheet coil packaging, the method comprising:
wrapping a sheet coil using a sheet coil wrapping arrangement; and
feeding out edge protection material along edges of the sheet coil as the sheet coil is rotated by a sheet coil rotating arrangement during said wrapping of the sheet coil, using two edge protection mounting devices, each comprising a mounting arm arrangement, on which at least one edge protection material guide is arranged to feed out and guide edge protection material into correct positions along at least one edge of a sheet coil, as the sheet coil is rotated by the sheet coil rotating arrangement while it is wrapped by the sheet coil wrapping arrangement thereby fixing the edge protection material to the edges of the sheet coil by the wrapping, wherein the feeding out of edge protection material through the at least one edge protection material guide comprises displacing the edge protection material sideways from the mounting arm arrangement.

18. The method according to claim 17, further comprising arranging, on each mounting arm arrangement, an outer edge protection material guide to feed out and guide edge protection material into a correct position along an outer edge of a sheet coil, and an inner edge protection material guide to feed out and guide edge protection material into a correct position along an inner edge of a sheet coil.

19. The method according to claim 17, further comprising moving the part of the mounting arm arrangement comprising the at least one edge protection material guide out of the way when the at least one edge protection material guide is not needed, using a hinge arrangement comprised in the mounting arm arrangement.

20. The method according to claim 17, further comprising positioning the edge protection material guides so that they will guide the edge protection material into the correct positions along the edges of the sheet coil, using an arm support, comprising a horizontal adjusting arrangement and a vertical adjusting arrangement, comprised in the edge protection mounting device.

21. The method according to claim 17, further comprising using an edge protection material that is thin enough to be wound up in a folded state on an edge protection material coil carried by the mounting arm arrangement.

22. The method according to claim 17, further comprising using an edge protection material that comprises slits along both longitudinal sides, so that a series of tongues are formed on both longitudinal sides.

23. The method according to claim 22, further comprising arranging the shape of the tongues to depend on the size of the sheet coil, in such a way that the tongues are shaped so that the slits become substantially closed at the base of the sheet coil when the edge protection material is mounted on the outer edge of the sheet coil.

24. The method according to claim 17, further comprising guiding the edge protection material in a folded state into correct positions along the edges of the sheet coil.

25. The method according to claim 17, further comprising arranging the sheet coil wrapping arrangement to comprise first and second industrial robots, having first and second robot arms, arranged to wrap the sheet coil using a wrapping tool, and the wrapping of the sheet coil to comprise using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement.

\* \* \* \* \*